United States Patent
Akashika

(10) Patent No.: US 10,373,155 B2
(45) Date of Patent: Aug. 6, 2019

(54) PAYMENT MODULE, PAYMENT METHOD, PROGRAM, AND INFORMATION RECORDING MEDIUM

(75) Inventor: Hideki Akashika, Shinagawa-ku (JP)

(73) Assignee: Rakuten, Inc., Setagaya-ku, Tokyo (JP)

( * ) Notice: Subject to any disclaimer, the term of this patent is extended or adjusted under 35 U.S.C. 154(b) by 0 days.

(21) Appl. No.: 14/113,876

(22) PCT Filed: Apr. 27, 2012

(86) PCT No.: PCT/JP2012/061482
§ 371 (c)(1),
(2), (4) Date: Oct. 25, 2013

(87) PCT Pub. No.: WO2012/147969
PCT Pub. Date: Nov. 1, 2012

(65) Prior Publication Data
US 2014/0052631 A1 Feb. 20, 2014

(30) Foreign Application Priority Data
Apr. 28, 2011 (JP) ................................ 2011-102520

(51) Int. Cl.
*G06Q 20/36* (2012.01)
*G06Q 20/34* (2012.01)
(Continued)

(52) U.S. Cl.
CPC ......... *G06Q 20/349* (2013.01); *G06Q 20/065* (2013.01); *G06Q 20/28* (2013.01);
(Continued)

(58) Field of Classification Search
CPC .............................. G06Q 20/36; G06Q 20/341
(Continued)

(56) References Cited

U.S. PATENT DOCUMENTS

| 5,521,362 A | 5/1996 | Powers |
| 6,321,213 B1 | 11/2001 | Ito et al. |

(Continued)

FOREIGN PATENT DOCUMENTS

| CN | 101093567 A | 12/2007 |
| CN | 101373512 A | 2/2009 |

(Continued)

OTHER PUBLICATIONS

International Searching Authority, Written Opinion of the International Preliminary Report on Patentability issued in corresponding International application No. PCT/JP2012/061480, dated Nov. 7, 2013.

(Continued)

*Primary Examiner* — Hai Tran
(74) *Attorney, Agent, or Firm* — Sughrue Mion, PLLC

(57) ABSTRACT

Provided is a payment module capable of allowing a total amount of money dispersedly recharged for a plurality of kinds of prepaid values to be used for a payment regardless of which of the prepaid values is used for the payment. An IC chip (22) stores a plurality of kinds of electronic values, and subtracts an amount of money that is equal to or more than a difference between a balance of an electronic value of the plurality of kinds of electronic values that is used for a payment and a payment amount as a total from balances of electronic values of the plurality of kinds of electronic values that are not used for the payment. The IC chip (22) adds the subtracted amount of money to the balance of the electronic value to be used for the payment, and subtracts the payment amount from the balance after the addition.

11 Claims, 10 Drawing Sheets

(51) Int. Cl.
*G06Q 20/28* (2012.01)
*G06Q 20/06* (2012.01)

(52) U.S. Cl.
CPC ....... *G06Q 20/341* (2013.01); *G06Q 20/3572* (2013.01); *G06Q 20/3574* (2013.01); *G06Q 20/35765* (2013.01)

(58) Field of Classification Search
USPC ..................................................... 705/38, 41
See application file for complete search history.

(56) References Cited

U.S. PATENT DOCUMENTS

| | | | |
|---|---|---|---|
| 6,336,104 B1* | 1/2002 | Walker et al. | 705/38 |
| 7,216,105 B2* | 5/2007 | Adamson | 705/41 |
| 7,707,077 B2* | 4/2010 | Muller et al. | 705/30 |
| 7,761,355 B2* | 7/2010 | Mallon et al. | 705/35 |
| 8,103,582 B1* | 1/2012 | Zettner | 705/39 |
| 8,195,482 B2* | 6/2012 | Darling et al. | 705/2 |
| 8,612,347 B1* | 12/2013 | Dabney | 705/40 |
| 2002/0139861 A1 | 10/2002 | Matsumoto et al. | |
| 2004/0128247 A1 | 7/2004 | Sato et al. | |
| 2007/0125840 A1 | 6/2007 | Law et al. | |
| 2007/0219900 A1* | 9/2007 | MacGuire | 705/38 |
| 2008/0016004 A1 | 1/2008 | Kurasaki et al. | |
| 2008/0040265 A1* | 2/2008 | Rackley, III et al. | 705/40 |
| 2008/0215173 A1* | 9/2008 | Hicken et al. | 700/94 |
| 2008/0277465 A1 | 11/2008 | Pletz et al. | |
| 2009/0050687 A1 | 2/2009 | Kon et al. | |
| 2009/0192913 A1 | 7/2009 | Saito et al. | |
| 2010/0223145 A1 | 9/2010 | Dragt | |
| 2011/0119182 A1 | 5/2011 | Smolkin | |
| 2011/0276420 A1* | 11/2011 | White | G06Q 20/105 705/17 |
| 2012/0047041 A1* | 2/2012 | Akel | 705/24 |
| 2012/0233071 A1* | 9/2012 | Winkelman et al. | 705/41 |
| 2013/0339165 A1* | 12/2013 | Calman | 705/16 |

FOREIGN PATENT DOCUMENTS

| | | |
|---|---|---|
| EP | 0 910 052 A2 | 4/1999 |
| EP | 1 560 172 A1 | 8/2005 |
| EP | 2 028 630 A2 | 2/2009 |
| GB | 2 324 898 A | 11/1998 |
| JP | 9-245104 A | 9/1997 |
| JP | 2004-234630 A | 8/2004 |
| JP | 2005-25618 A | 1/2005 |
| JP | 2005-352733 A | 12/2005 |
| JP | 2007-47939 A | 2/2007 |
| JP | 2009-48488 A | 3/2009 |
| JP | 2009-53764 A | 3/2009 |
| JP | 2009-176065 A | 8/2009 |
| WO | 2004003861 A1 | 1/2004 |
| WO | 2010/131012 A1 | 11/2010 |

OTHER PUBLICATIONS

Partial English Language Translation of Office Action dated Aug. 15, 2014 for Chinese Patent Application No. 201280020764.6.
United States Office Action dated Feb. 14, 2014 issued in corresponding U.S. Appl. No. 14/114,039.
European Patent Office, European Search Report, dated Nov. 12, 2014, issued in counterpart application No. 12777526.0-1955.
Wikipedia: "Oyster card", URL: http://en.wikipedia.org/w/index.php?title=oyster_card&oldid=288676923; May 8, 2009.
European Search Report dated Jan. 19, 2015 issued in application No. 12775983.5.
"Smart Card technology includes microprocessor, RAM, EPROM, EEPROM and card operating system COS", Dec. 16, 2001, CardWerk,http://cardwerk.com/smartcards/smartcard_technology.aspx, 4 pages total.
Communication dated May 12, 2017 from the European Patent Office in counterpart Application No. 12 775 983.5.
International Search Report for PCT/JP2012/061480 dated Jul. 31, 2012.
International Search Report for PCT/JP2012/061482 dated Jul. 3, 2012.
An Office Action dated Feb. 9, 2017, which issued during the prosecution of U.S. Appl. No. 14/114,096.
Communication dated Dec. 7, 2016, from the European Patent Office in corresponding European Application No. 12775983.5.
Anonymous, "Java Card (TM) Platform Security Technical White Paper". Sun Microsystems, Inc. Nov. 4, 2003, XP055317544 (28 pages total).
Communication dated Jan. 22, 2019 from European Patent Office in counterpart EP Application No. 12777526.0.
Communication dated Jul. 17, 2018, from the European Patent Office in counterpart European Application No. 12777449.5.

* cited by examiner

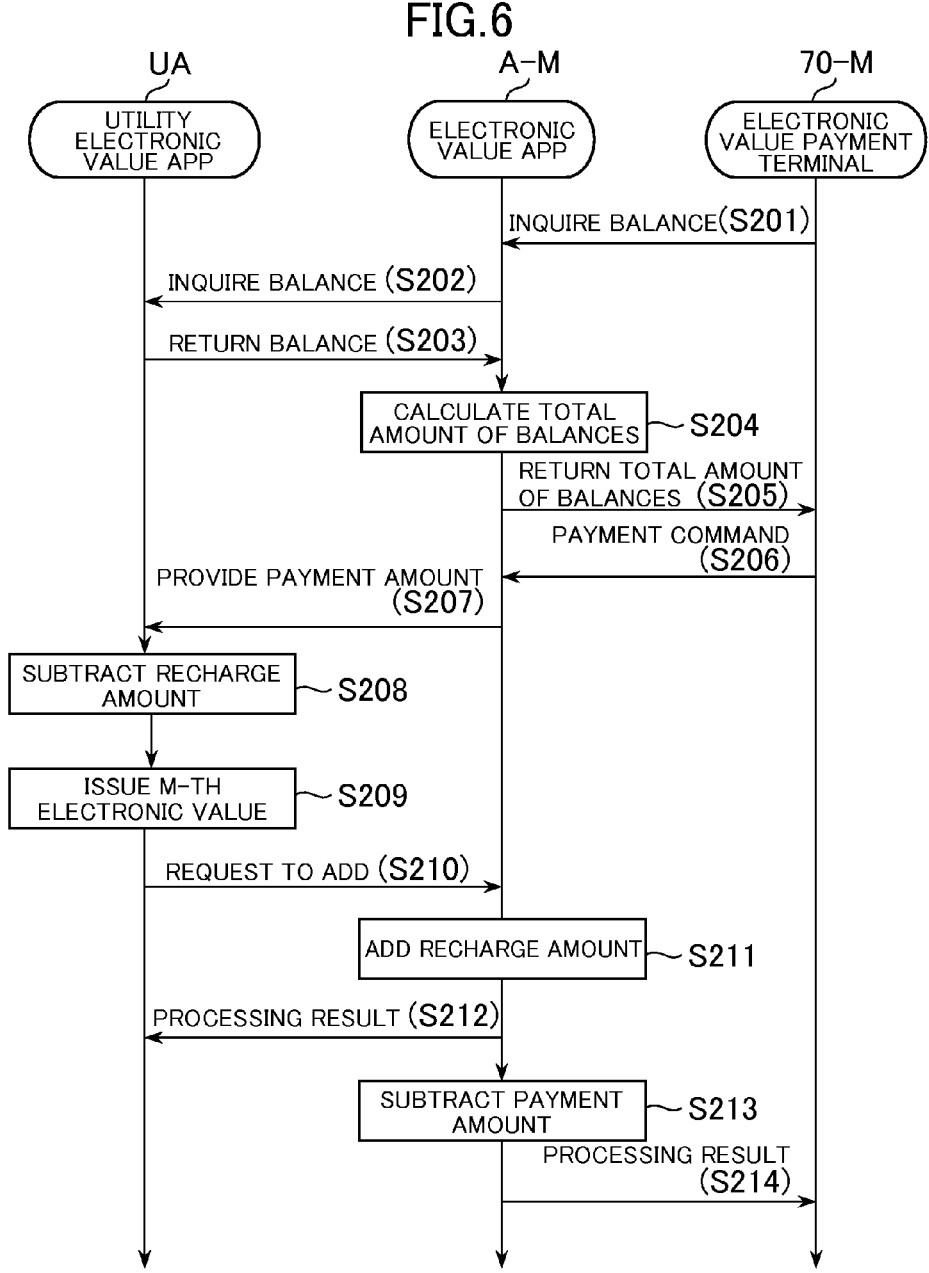

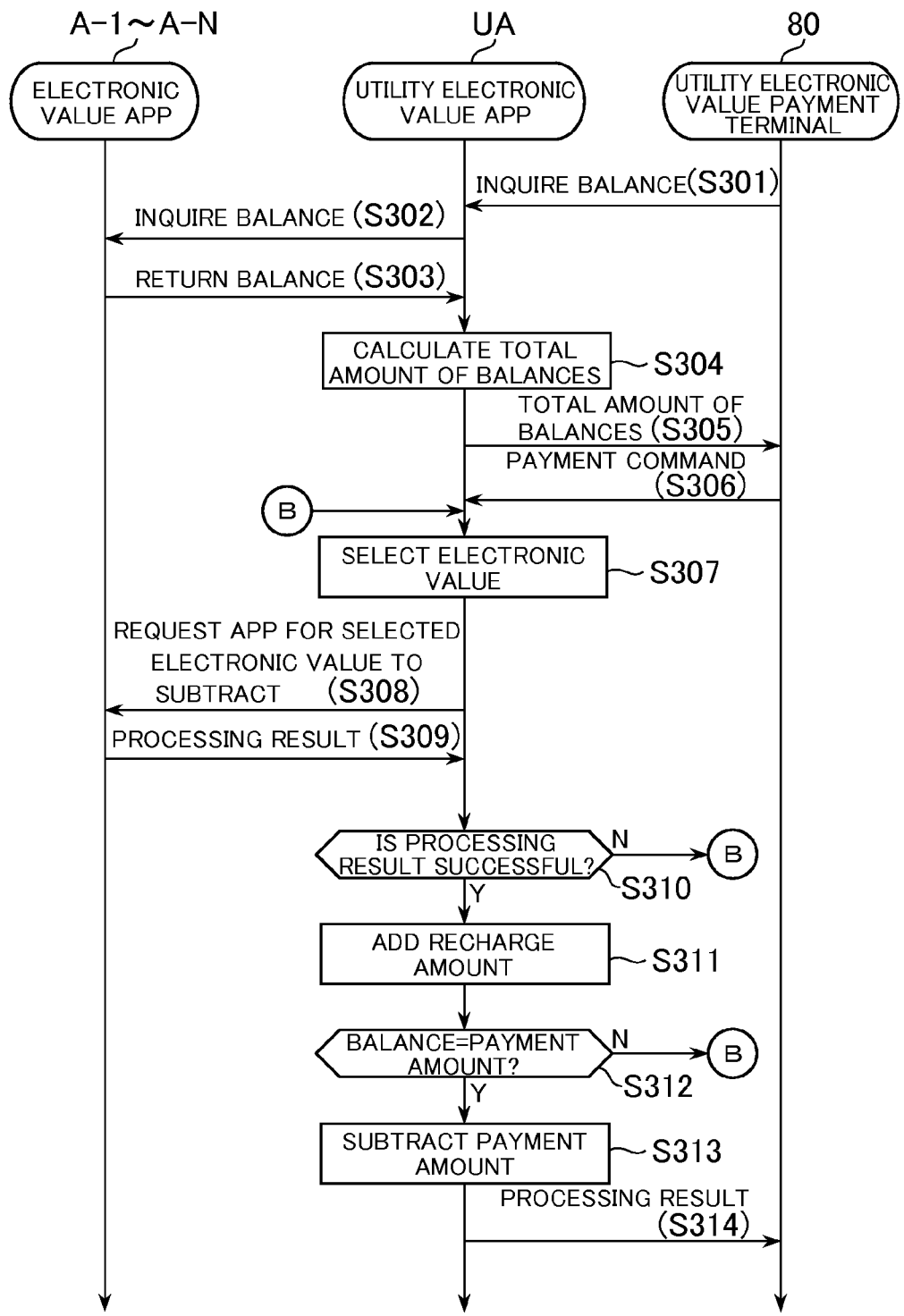

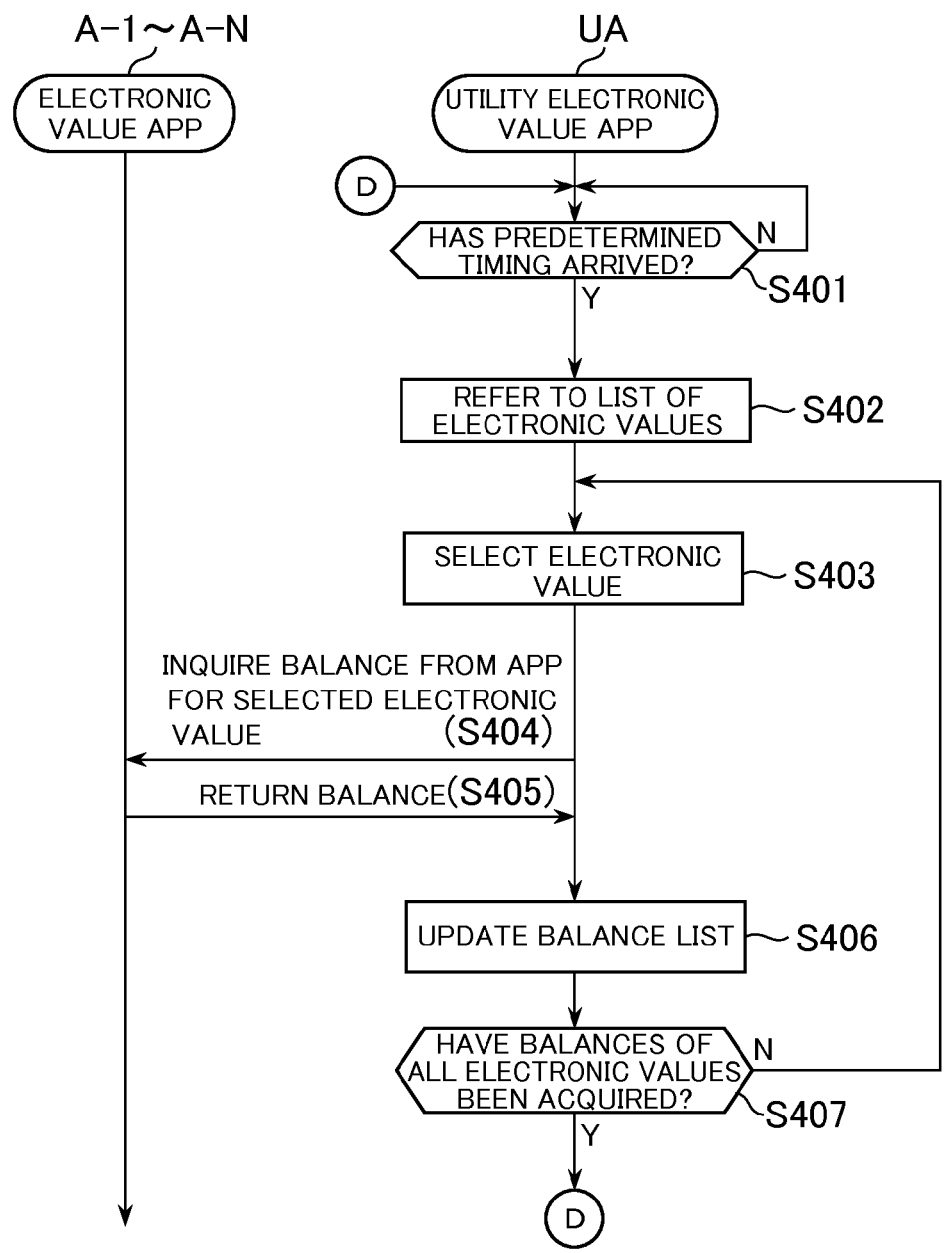

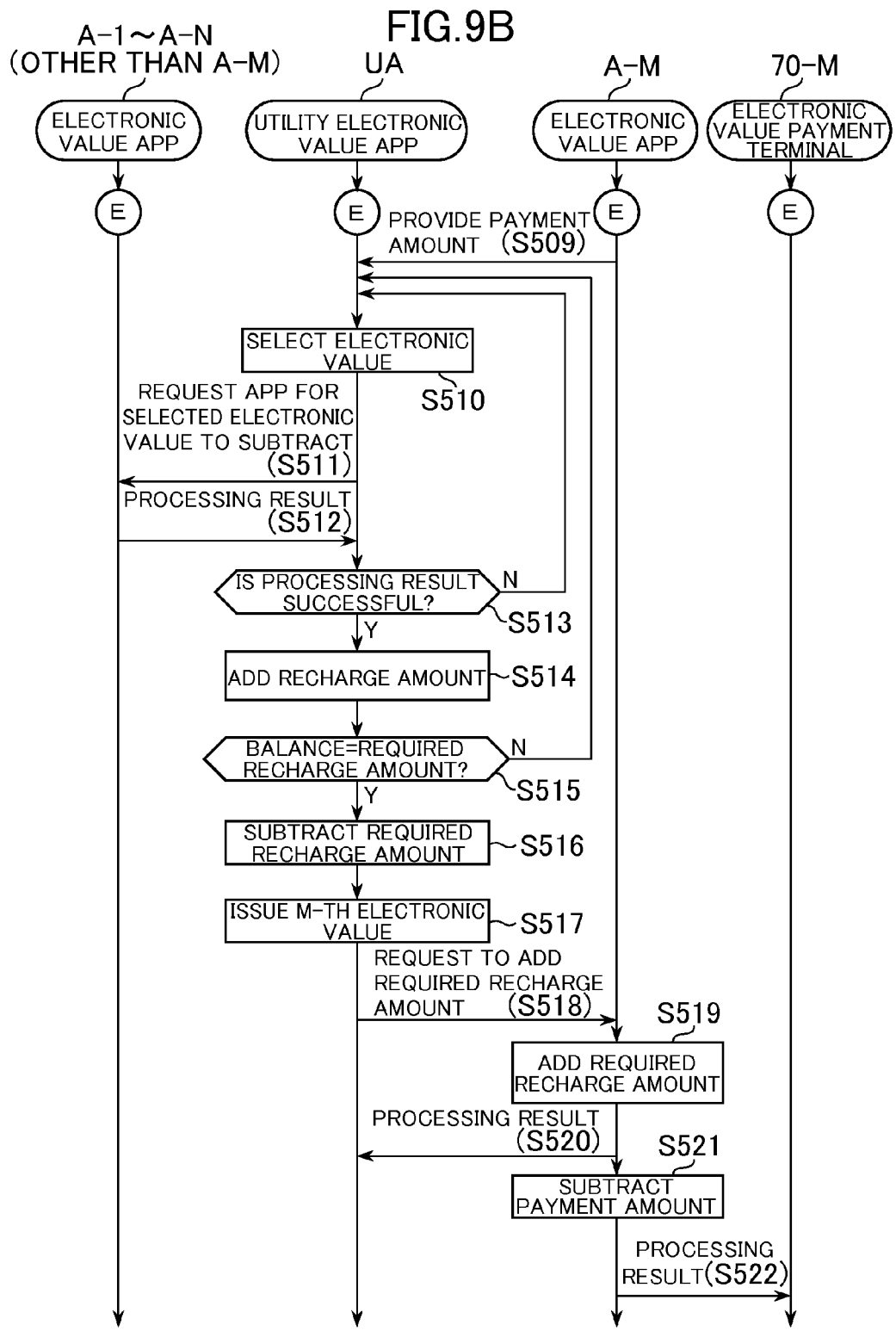

PAYMENT MODULE, PAYMENT METHOD, PROGRAM, AND INFORMATION RECORDING MEDIUM

CROSS REFERENCE TO RELATED APPLICATIONS

This application is a National Stage of International Application No. PCT/JP2012/061482 filed Apr. 27, 2012, claiming priority based on Japanese Patent Application No. 2011-102520 filed Apr. 28, 2011, the contents of all of which are incorporated herein by reference in their entirety.

TECHNICAL FIELD

The present invention relates to a payment module, a payment method, a program, and an information recording medium.

BACKGROUND ART

There is known an electronic payment system in which electronic information (electronic value) having a monetary value is held in an electronic value holding medium such as an IC chip and the electronic value holding medium holding the electronic value is held over a payment terminal to make a payment. In such electronic payment system, the payment is made by subtracting a payment amount from a balance of the electronic value held in the electronic value holding medium. However, when the balance of the electronic value is below the payment amount, the payment cannot be made. To address this, there have conventionally been proposed a technology of automatically recharging the electronic value when the balance of the electronic value held in the electronic value holding medium becomes equal to or less than a certain amount (for example, Patent Literature 1 below), and a technology of reloading a virtual change purse storing electronic money for use in paying a small amount of money with electronic money from a virtual wallet for use in paying a large amount of money (for example, Patent Literature 2 below).

CITATION LIST

Patent Literature

[Patent Literature 1] JP 2005-025618 A
[Patent Literature 2] JP 09-245104 A

SUMMARY OF INVENTION

Technical Problem

A plurality of kinds of electronic values are available, of which a payment terminal may accept only certain kinds of electronic values. Therefore, it is common to recharge each of the plurality of kinds of electronic values in an electronic value holding medium in advance and select one of the electronic values accepted by the payment terminal for use as appropriate. Conventionally, a total amount of balances dispersedly held for the plurality of different electronic values in the electronic value holding medium as described above cannot be used for a payment.

The present invention has been made in view of the above-mentioned problem, and an object of the present invention is therefore to provide a payment module capable of allowing a total amount of money dispersedly recharged for a plurality of kinds of electronic values to be used for a payment regardless of which of the electronic values is used for the payment, a payment method, a program, and an information recording medium.

Solution to Problem

In order to achieve the above-mentioned object, according to of the present invention, there is provided a payment module, including: a plurality of balance change means for changing balances of a plurality of stored electronic values, respectively; storage means for storing a balance of a utility electronic value; first reload amount acquisition means for acquiring a first reload amount required for deducting a required amount, which is specified in balance change information input for one electronic value of the plurality of stored electronic values from an external, from a balance of the one electronic value; second reload amount acquisition means for acquiring a second reload amount required for deducting the acquired first reload amount from the balance of the utility electronic value stored in the storage means; first balance change information generation means for generating, in order that a total amount of money deducted from balances of other electronic values of the plurality of stored electronic values than the one electronic value equals the acquired second reload amount, at least one piece of balance change information for decreasing a balance of at least one electronic value of the other electronic values, respectively; and second balance change information generation means for generating, when in response to the generated at least one piece of balance change information the balance of the corresponding at least one electronic value is changed by corresponding at least one of the plurality of balance change means, respectively, balance change information for increasing the balance of the utility electronic value by the second reload amount, decreasing the balance of the utility electronic value by the first reload amount, and increasing the balance of the one electronic value by the first reload amount in the storage means, in which one of the plurality of balance change means corresponding to the one electronic value changes, in response to the balance change information generated by the second balance change information generation means and the balance change information input from the external, the balance of the one electronic value.

According to an aspect of the present invention, the above-mentioned payment module may further include first reload amount output means for determining and outputting the first reload amount based on the balance of the one electronic value and the required amount.

According to an aspect of the present invention, the first reload amount output means may determine a difference, which is obtained by subtracting the balance of the one electronic value from the required amount, as the first reload amount.

According to an aspect of the present invention, the above-mentioned payment module may further include reload amount output means for outputting the required amount as the first reload amount.

According to an aspect of the present invention, the above-mentioned payment module may further include second reload amount output means for determining and outputting the second reload amount based on the balance of the utility electronic value and the first reload amount.

According to an aspect of the present invention, the second reload amount output means may determine a difference, which is obtained by subtracting the balance of the utility electronic value from the first reload amount, as the second reload amount.

According to an aspect of the present invention, the above-mentioned payment module may further include second reload amount output means for outputting the first reload amount as the second reload amount.

According to an aspect of the present invention, the above-mentioned payment module may further include: a plurality of balance output means for reading and outputting the balances of the plurality of stored electronic values, respectively; first balance acquisition means for acquiring, when a balance request is input for one electronic value of the plurality of stored electronic values from the external, the balance of the utility electronic value stored in the storage means; balance request issuance means for issuing, when the balance request is input for the one electronic value of the plurality of stored electronic values from the external, at least one balance request to acquire a balance of at least one electronic value of the plurality of stored electronic values other than the one electronic value, respectively; and second balance acquisition means for acquiring, when in response to the issued at least one balance request the balance of the corresponding at least one electronic value is output from corresponding at least one of the plurality of balance output means, respectively, a total amount of the output balance of the at least one electronic value and the acquired balance of the utility electronic value, in which one of the plurality of balance output means corresponding to the one electronic value may output a combined amount of a balance of the one electronic value and the total amount acquired by the second balance acquisition means as the balance of the one electronic value.

According to the present invention, there is provided a payment method for use in a payment module including a plurality of balance change means for changing balances of a plurality of stored electronic values, respectively, and storage means for storing a balance of a utility electronic value, the payment method including: a first reload amount acquisition step of acquiring a first reload amount required for deducting a required amount, which is specified in balance change information input for one electronic value of the plurality of stored electronic values from an external, from a balance of the one electronic value; a second reload amount acquisition step of acquiring a second reload amount required for deducting the acquired first reload amount from the balance of the utility electronic value stored in the storage means; a first balance change information generation step of generating, in order that a total amount of money deducted from balances of other electronic values of the plurality of stored electronic values than the one electronic value equals the acquired second reload amount, at least one piece of balance change information for decreasing a balance of at least one electronic value of the other electronic values, respectively; and a second balance change information generation step of generating, when in response to the generated at least one piece of balance change information the balance of the corresponding at least one electronic value is changed by corresponding at least one of the plurality of balance change means, respectively, balance change information for increasing the balance of the utility electronic value by the second reload amount, decreasing the balance of the utility electronic value by the first reload amount, and increasing the balance of the one electronic value by the first reload amount in the storage means, in which one of the plurality of balance change means corresponding to the one electronic value changes, in response to the balance change information generated by the second balance change information generation step and the balance change information input from the external, the balance of the one electronic value.

According to the present invention, there is provided a program for causing a computer, which functions as a payment module including a plurality of balance change means for changing balances of a plurality of stored electronic values, respectively, and storage means for storing a balance of a utility electronic value, to function as: first reload amount acquisition means for acquiring a first reload amount required for deducting a required amount, which is specified in balance change information input for one electronic value of the plurality of stored electronic values from an external, from a balance of the one electronic value; second reload amount acquisition means for acquiring a second reload amount required for deducting the acquired first reload amount from the balance of the utility electronic value stored in the storage means; first balance change information generation means for generating, in order that a total amount of money deducted from balances of other electronic values of the plurality of stored electronic values than the one electronic value equals the acquired second reload amount, at least one piece of balance change information for decreasing a balance of at least one electronic value of the other electronic values, respectively; and second balance change information generation means for generating, when in response to the generated at least one piece of balance change information the balance of the corresponding at least one electronic value is changed by corresponding at least one of the plurality of balance change means, respectively, balance change information for increasing the balance of the utility electronic value by the second reload amount, decreasing the balance of the utility electronic value by the first reload amount, and increasing the balance of the one electronic value by the first reload amount in the storage means, in which one of the plurality of balance change means corresponding to the one electronic value changes, in response to the balance change information generated by the second balance change information generation means and the balance change information input from the external, the balance of the one electronic value.

According to the present invention, there is provided an information recording medium having recorded thereon a program for causing a computer, which functions as a payment module including a plurality of balance change means for changing balances of a plurality of stored electronic values, respectively, and storage means for storing a balance of a utility electronic value, to function as: first reload amount acquisition means for acquiring a first reload amount required for deducting a required amount, which is specified in balance change information input for one electronic value of the plurality of stored electronic values from an external, from a balance of the one electronic value; second reload amount acquisition means for acquiring a second reload amount required for deducting the acquired first reload amount from the balance of the utility electronic value stored in the storage means; first balance change information generation means for generating, in order that a total amount of money deducted from balances of other electronic values of the plurality of stored electronic values than the one electronic value equals the acquired second reload amount, at least one piece of balance change information for decreasing a balance of at least one electronic value of the other electronic values, respectively; and second balance change information generation means for generating, when in response to the generated at least one piece of balance change information the balance of the corresponding at least one electronic value is changed by corresponding at least one of the plurality of balance change means, respectively, balance change information for increasing the balance of the utility electronic value by the second reload amount, decreasing the balance of the utility electronic value by the first reload amount, and increasing the balance of the one electronic value by the first reload amount in the storage means, in which one of the plurality of balance change means corresponding to the one electronic value changes, in response to the balance change information generated by the second balance change information generation means and the balance change information input from the external, the balance of the one electronic value.

Advantageous Effects of Invention

According to the aspect of the present invention, the total amount of money dispersedly recharged for the plurality of kinds of electronic values may be used for the payment regardless of which of the electronic values is used for the payment.

BRIEF DESCRIPTION OF DRAWINGS

FIG. 6 A sequence chart of payment processing according to a first embodiment.

FIG. 7 A sequence chart of payment processing according to a second embodiment.

FIG. 8 A sequence chart of balance list update processing.

FIG. 9B A sequence chart of the payment processing according to the third embodiment.

DESCRIPTION OF EMBODIMENTS

A description is given below of embodiment modes (hereinafter referred to as embodiments) of the present invention with reference to the drawings.

(Configuration Example of Electronic Value Payment System)

Figure 1:
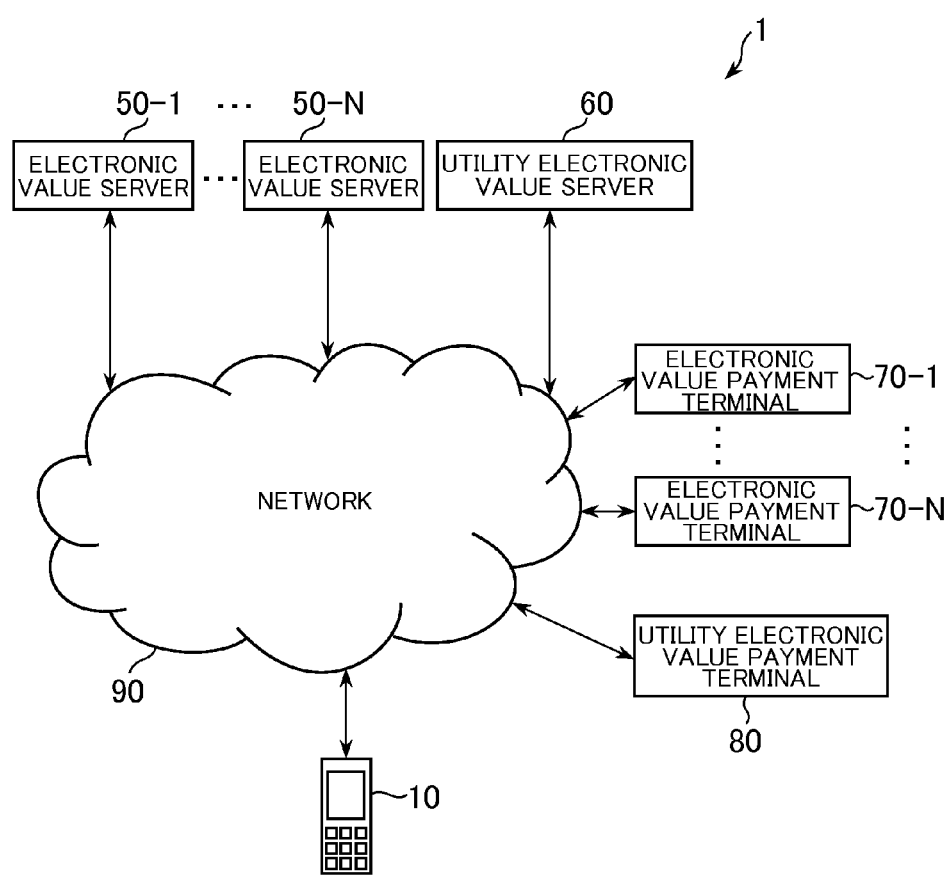
FIG. 1 A system configuration diagram of an electronic value payment system.

FIG. 1 is a system configuration diagram of an electronic value payment system 1 according to the embodiments of the present invention. As illustrated in FIG. 1, the electronic value payment system 1 includes a user terminal 10, electronic value servers 50-1 to 50-N (N is a natural number), a utility electronic value server 60, electronic value payment terminals 70-1 to 70-N, and a utility electronic value payment terminal 80. The user terminal 10 may hold first to N-th electronic values of different kinds from one another and a utility electronic value mutually exchangeable with the first to N-th electronic values. Note that, the first to N-th electronic values may be, for example, prepaid electronic money, and the utility electronic value may be, for example, prepaid electronic money, bank account data, available credit data, and the like. The electronic value servers 50-1 to 50-N are servers for managing the first to N-th electronic values, respectively, and the electronic value payment terminals 70-1 to 70-N are terminals for making payments with the first to N-th electronic values, respectively.

The user terminal 10 is connected to the electronic value servers 50-1 to 50-N and the utility electronic value server 60 via a network 90 so as to be mutually communicable. Further, the electronic value payment terminals 70-1 to 70-N and the utility electronic value payment terminal 80 are connected to the corresponding electronic value servers 50-1 to 50-N and the utility electronic value server 60, respectively, via the network 90 or a dedicated line (not shown) so as to be mutually communicable.

The electronic value server 50-$i$ ($i$=1 to N) performs issuance of the i-th electronic value, transfer (such as recharge) of the i-th electronic value, management of the used i-th electronic value, and the like.

The utility electronic value server 60 performs issuance the utility electronic value, transfer (such as recharge) of the utility electronic value, management of the used utility electronic value, and the like. Note that, in the embodiments of the present invention, an exchange rate between each of the first to N-th electronic values and the utility electronic value (a ratio indicating how many units of the utility electronic value are exchanged for one unit (such as yen or point) of each of the first to N-th electronic values) is 1:1, but the present invention is not limited thereto.

The electronic value payment terminal 70-$i$ ($i$=1 to N) performs non-contact communication to/from the user terminal 10 or an IC card including an IC chip holding the i-th electronic value and performs payment processing of subtracting a payment amount from a balance of the i-th electronic value held in the IC chip. In the embodiments of the present invention, for simplicity, the electronic value payment terminal 70-$i$ is a dedicated terminal for a payment with the i-th electronic value, but may be a payment terminal that accepts payments with a plurality of kinds of electronic values.

The utility electronic value payment terminal 80 performs non-contact communication to/from the user terminal 10 or an IC card including the IC chip holding the utility electronic value and performs payment processing of subtracting a payment amount from a balance of the utility electronic value held in the IC chip.

The user terminal 10 is an information processing terminal such as a mobile phone having mounted therein the IC chip capable of holding electronic values. For example, the user terminal 10 may perform wireless communication to/from a base station apparatus (not shown) to connect to the network 90, access the electronic value servers 50-1 to 50-N and the utility electronic value server 60, and recharge the first to N-th electronic values and the utility electronic value, respectively, and may perform non-contact communication to/from the electronic value payment terminals 70-1 to 70-N and the utility electronic value payment terminal 80 to execute a payment with the recharged first to N-th electronic values and the recharged utility electronic value, respectively.

(Configuration Example of User Terminal 10)

Figure 2:
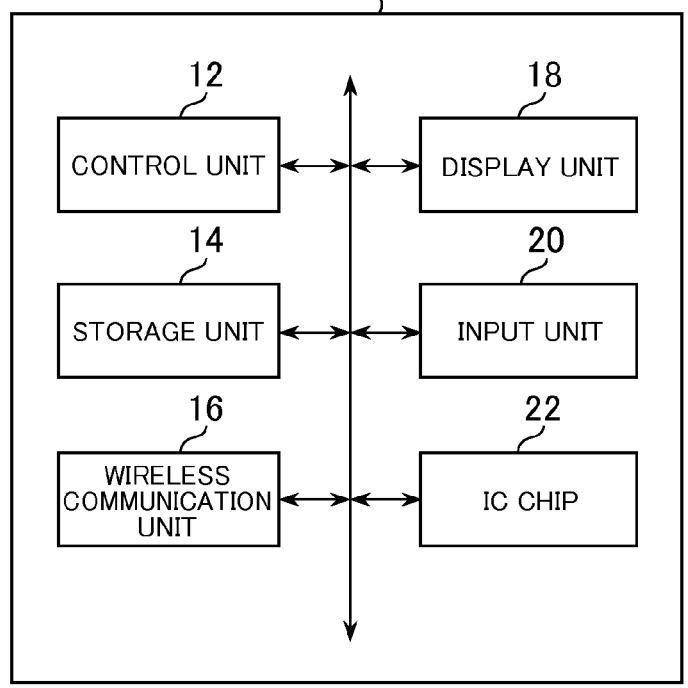
FIG. 2 A configuration diagram of a user terminal.

FIG. 2 is an example of a configuration diagram of the user terminal 10. As illustrated in FIG. 2, the user terminal 10 includes a control unit 12, a storage unit 14, a wireless communication unit 16, a display unit 18, an input unit 20, and an IC chip 22.

The control unit 12 includes a CPU to execute various kinds of arithmetic processing and control the units of the user terminal 10 based on programs stored in the storage unit 14.

The storage unit 14 stores an operating system of the user terminal 10 and programs and data for using the first to N-th electronic values and the utility electronic value, and is also used as a work memory for the control unit 12.

The wireless communication unit 16 communicates wirelessly to/from the base station apparatus (not shown) to perform data communication to/from the electronic value servers 50-1 to 50-N and the utility electronic value server 60 via the base station apparatus.

The display unit 18 is constituted of, for example, a display device such as a liquid crystal display, and displays various kinds of screens based on graphic data generated by processing of the control unit 12.

The input unit 20 is constituted of, for example, a keyboard or a touch panel, and receives an input of an operation by a user.

The IC chip 22 holds the first to N-th electronic values and the utility electronic value and performs non-contact communication to/from the electronic value payment terminals 70-1 to 70-N and the utility electronic value payment terminal 80 to execute the payment processing. Next, details of the IC chip 22 are described.

(Configuration of IC Chip 22)

Figure 3:
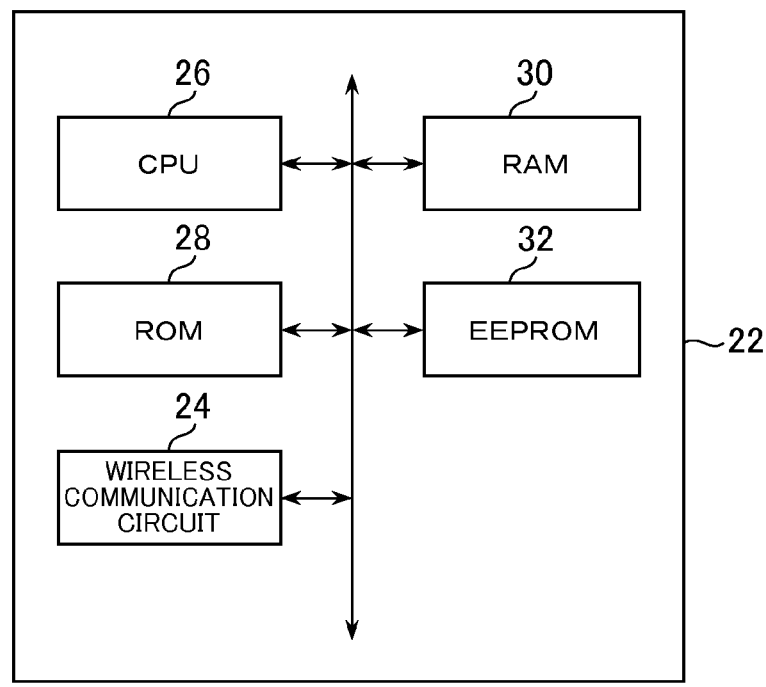
FIG. 3 A hardware configuration diagram of an IC chip.

FIG. 3 illustrates an example of a hardware configuration of the IC chip 22. As illustrated in FIG. 3, the IC chip 22 includes a wireless communication circuit 24, a CPU 26, a ROM 28, a RAM 30, and an EEPROM 32.

The wireless communication circuit 24 includes, for example, an antenna and a high-frequency circuit, and performs wireless communication over short distance (for example, within several tens of centimeters) to/from the electronic value payment terminals 70-1 to 70-N and the utility electronic value payment terminal 80.

The CPU 26 is a central processing unit for executing arithmetic processing and controlling the units of the IC chip 22 based on a control program stored in the ROM 28, and electronic value apps 1 to N, a utility electronic value app, and the like stored in the EEPROM 32.

The ROM 28 is a memory capable only of reading data and stores, for example, the control program and control data of the IC chip 22.

The RAM 30 is a memory capable of writing and reading data and is used as a working memory for processing by the CPU 26 or a temporary data storage area.

The EEPROM 32 is a non-volatile memory capable of writing and reading data. The EEPROM 32 stores, for example, payment programs for the electronic values and the electronic values.

(Configuration Example of EEPROM 32)

Figure 4:
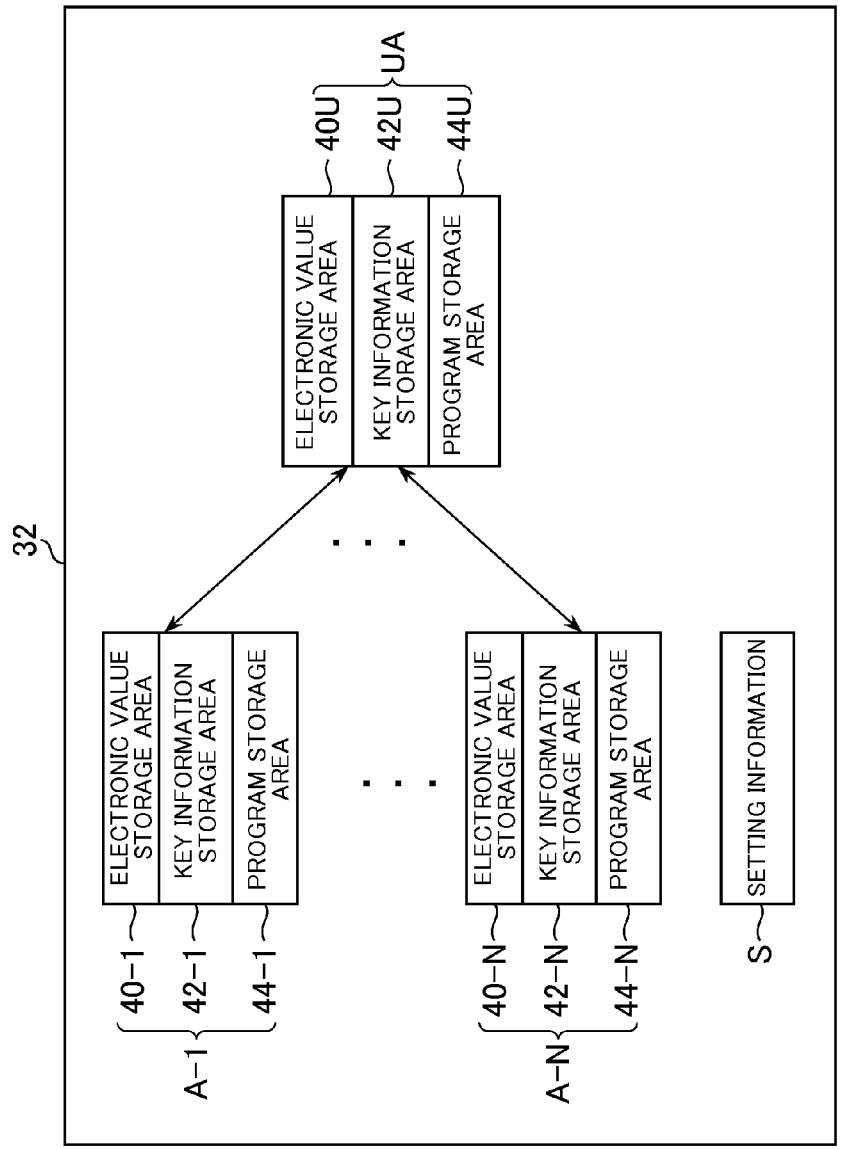
FIG. 4 A diagram illustrating an example of data stored in an EEPROM.

FIG. 4 illustrates an example of data stored in the EEPROM 32. As illustrated in FIG. 4, the EEPROM 32 stores, for example, electronic value applications A-1 to A-N (hereinafter referred to as electronic value apps A-1 to A-N), a utility electronic value application UA (hereinafter referred to as utility electronic value app UA), and setting information S.

The electronic value app A-$i$ ($i=1$ to N) includes, for example, an electronic value storage area 40-$i$, a key information storage area 42-$i$, and a program storage area 44-$i$, and each of the storage areas is encrypted by an encryption key specific to the i-th electronic value. In order to read, write, and execute data and programs stored in each of the above-mentioned storage areas, the encryption key for the i-th electronic value may be required.

The electronic value storage area 40-$i$ stores, for example, the balance and usage log data of the i-th electronic value.

The key information storage area 42-$i$ stores, for example, information on an encryption key for the utility electronic value.

The program storage area 44-$i$ stores, for example, for each command, a program describing processing to be executed when the command is received. For example, the program storage area 44-$i$ stores programs for processing of inquiring the balance of the electronic value stored in the electronic value storage area 40-$i$, processing of adding a specified recharge amount to the balance of the electronic value stored in the electronic value storage area 40-$i$, processing of subtracting a specified payment amount from the balance of the electronic value stored in the electronic value storage area 40-$i$, and various kinds of processing for cooperating with the utility electronic value app UA. For example, authentication required when the electronic value app is to cooperate with the utility electronic value app UA may use the key information for the utility electronic value stored in the key information storage area 42-$i$. Note that, in place of or in addition to the program describing the above-mentioned addition processing and the program describing the above-mentioned subtraction processing, a program describing balance overwrite processing to be executed when a command to overwrite the balance of the electronic value is received may be stored. Note that, in the embodiments of the present invention, an add command, a subtract command, and an overwrite command for the electronic value correspond to balance change information for the electronic value. In the following embodiments, it is assumed that the balance change information is the add command and the subtract command.

The utility electronic value app UA includes, for example, an electronic value storage area 40U, a key information storage area 42U, and a program storage area 44U, and each of the storage areas is encrypted based on the encryption key specific to the utility electronic value. In order to read, write, and execute data and programs stored in each of the above-mentioned storage areas, the encryption key for the utility electronic value may be required.

The electronic value storage area 40U stores, for example, the balance and usage log data of the utility electronic value.

The key information storage area 42U stores, for example, information on the encryption key for each of the first to N-th electronic values.

The program storage area 44U stores, for each command, a program for processing the command when the command is received. For example, the program storage area 44U stores programs for processing of inquiring the balance of the utility electronic value stored in the electronic value storage area 40U, processing of adding a specified recharge amount to the balance of the utility electronic value stored in the electronic value storage area 40U, processing of subtracting a specified payment amount from the balance of the utility electronic value stored in the electronic value storage area 40U, and various kinds of processing for cooperating with the electronic value apps A-1 to A-N. Note that, when the utility electronic value app UA is to cooperate with the electronic value apps A-1 to A-N, authentication may be performed by using the key information of each of the first to N-th electronic values stored in the key information storage area 42U. Further, in place of or in addition to the program describing the above-mentioned addition processing and the program describing the above-mentioned subtraction processing, a program describing balance overwrite processing to be executed when a command to overwrite the balance of the utility electronic value is received may be stored.

The setting information S stored in the EEPROM 32 may include, for example, setting information on recharging the electronic values. Specifically, the setting information S may include a setting for selecting one of the first to N-th electronic values to be used for recharging the utility electronic value (electronic value selection setting), a setting for automatically recharging the utility electronic value (automatic recharge setting), and the like. An example of each of the electronic value selection setting and the automatic recharge setting is described below.

In the electronic value selection setting, for example, orders of priority may be set for the first to N-th electronic values, respectively. In this case, processing of recharging the utility electronic value with the electronic value selected in a descending order of priority may be executed until a specified condition is satisfied. Note that, the orders of priority may be set in advance for the first to N-th electronic values, or may be set based on balances of the first to N-th electronic values. Alternatively, in the electronic value selection setting, for example, a plurality of (for example, all) electronic values may be set to be selected from among the first to N-th electronic values. In this case, a recharge amount to be recharged to the utility electronic value may be equally divided among the selected plurality of electronic values, or may be divided at a ratio corresponding to the respective balances of the selected plurality of electronic values.

In the automatic recharge setting, for example, a condition to be satisfied to start automatically recharging the utility electronic value (automatic recharge start condition) and a recharge amount for the automatic recharge (automatic recharge amount) may be set. The automatic recharge start condition may be, for example, that the balance of the utility electronic value is equal to or less than a threshold value (or is less than the threshold value). Note that, a timing for determining the automatic recharge start condition may be a predetermined time, after a predetermined period has elapsed since the last recharge, immediately after the payment, or the like. Alternatively, the automatic recharge amount may be a predetermined amount (for example, upper limit amount or set amount registered in advance by the user), an amount obtained by subtracting the current balance from a predetermined amount, an arbitrary set amount, or the like.

(Flowchart of Automatic Recharge Processing)

Figure 5:
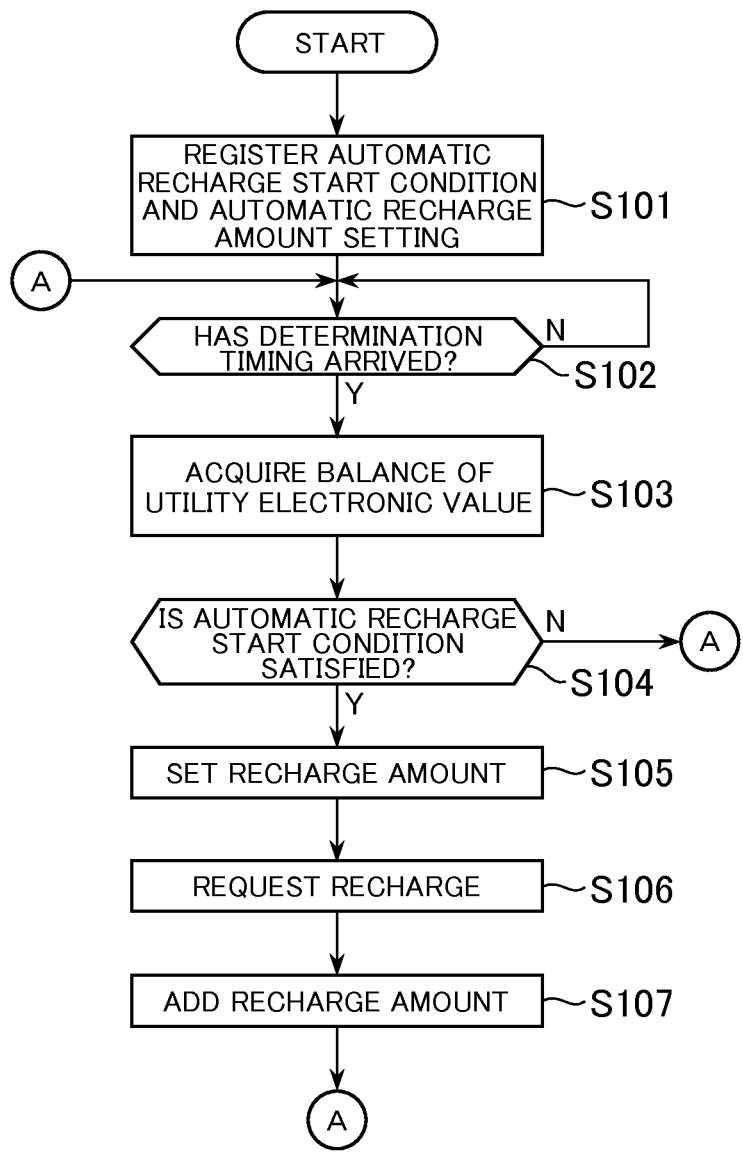
FIG. 5 A flowchart of automatic recharge processing.

Next referring to a flowchart illustrated in FIG. 5, an example of automatic recharge processing performed by the user terminal 10 is described. Note that, in the flowchart illustrated in FIG. 5, the automatic recharge processing for the utility electronic value is described, but the automatic recharge processing may be executed similarly for the other electronic values 1 to N.

As illustrated in FIG. 5, the user terminal 10 registers, as initial settings, the automatic recharge start condition to start the automatic recharge (for example, that the balance is less than a threshold value: X yen), and the automatic recharge amount setting (for example, Y yen), respectively, for example, based on inputs from the user (S101).

Next, the user terminal 10 waits when the timing for determining the automatic recharge (for example, the timing when a predetermined time interval has elapsed since the last determination) has not arrived (S102: N), and acquires the balance of the utility electronic value held in the IC chip 22 (S103) when the above-mentioned determination timing has arrived (S102: Y). Then, the user terminal 10 returns to S102 when the acquired balance does not satisfy the automatic recharge start condition set in S101 (for example, the acquired balance is equal to or more than X yen) (S104: N), and sets the recharge amount based on the set automatic recharge amount setting (S105) when the acquired balance satisfies the automatic recharge start condition (for example, the acquired balance is less than X yen) (S104: Y). Then, the user terminal 10 requests the utility electronic value server 60 to recharge with the recharge amount set in S105 (S106), and when allowed to recharge by the utility electronic value server 60, adds the recharge amount set in S105 to the balance of the utility electronic value (S107). The user terminal 10 returns to S102 again after completing the recharge.

According to the automatic recharge processing described above, the balance of the electronic value (for example, utility electronic value) held in the user terminal 10 may be controlled so as not to fall below a certain amount.

(First Embodiment)

Next referring to a sequence chart illustrated in FIG. 6, payment processing according to a first embodiment is described. In the first embodiment, an electronic value (in this case, M-th electronic value) of the first to N-th electronic values that is used for a payment is applied an electronic value from the utility electronic value to make the payment. Note that, in the example described below, it is assumed that the balance of the M-th electronic value at the time of starting the payment is below the payment amount. Note that, in the first embodiment, the utility electronic value app UA causes, in cooperation with hardware resources such as the IC chip 22 included in the user terminal 10, the user terminal 10 to operate as a terminal having a virtual asynchronous deposit function (virtual offline recharge function).

As illustrated in FIG. 6, when a balance inquiry command for the M-th electronic value to be used for the payment is transmitted from the electronic value payment terminal 70-M (S201), the electronic value app A-M running on the IC chip 22 issues a balance inquiry command to the utility electronic value app UA (S202). Then, the electronic value app A-M receives the balance of the utility electronic value from the utility electronic value app UA (S203).

The electronic value app A-M calculates a total amount of balances by summing the balance of the utility electronic value received in S203 and the balance of the M-th electronic value (S204), and transmits the total amount of balances to the electronic value payment terminal 70-M (S205). When the total amount of balances is equal to or more than the payment amount, the electronic value payment terminal 70-M transmits a payment command specifying the payment amount (required amount) (S206).

When receiving the above-mentioned payment command, the electronic value app A-M provides the utility electronic value app UA with the payment amount specified in the payment command (S207).

The utility electronic value app UA sets a difference between the payment amount and the balance of the M-th electronic value as the recharge amount (reload amount), and subtracts the recharge amount from the balance of the utility electronic value (S208). Note that, the recharge amount may be an amount equal to or more than the difference between the payment amount and the balance of the M-th electronic value, or the payment amount specified in the payment command may be directly set as the recharge amount. The utility electronic value app UA newly issues the recharge amount's worth of the M-th electronic value (S209), and requests the electronic value app A-M to add the issued recharge amount's worth to the M-th electronic value (S210). In this case, the utility electronic value app UA generates and outputs the add command (balance change information) to increase the balance of the M-th electronic value.

The electronic value app A-M adds, in response to the generated add command, the recharge amount to the balance of the M-th electronic value (S211), and notifies the utility electronic value app UA of the processing result (success/failure) (S212). Further, the electronic value app A-M subtracts, in response to the payment command input from the electronic value payment terminal 70-M, the payment amount from the balance of the M-th electronic value after the addition to the balance (S213), and transmits the processing result (success/failure) to the electronic value payment terminal 70-M (S214).

The utility electronic value app UA may perform the processing of S207 and subsequent steps as follows. For example, the utility electronic value app UA may check, after the payment amount is provided from the electronic value app A-M, whether or not the balance of the utility electronic value can afford the recharge amount. Then, when the balance of the utility electronic value can afford the recharge amount, the utility electronic value app UA may issue the recharge amount's worth of the M-th electronic value, and request the electronic value app A-M to add the issued recharge amount's worth to the M-th electronic value. Then, the electronic value app A-M may add the recharge amount to the balance of the M-th electronic value, and notify the utility electronic value app UA of the processing result (success/failure). Then, when receiving the notification of the successful addition from the electronic value app A-M, the utility electronic value app UA may subtract the recharge amount from the balance of the utility electronic value. Thereafter, the electronic value app A-M may subtract the payment amount from the balance of the M-th electronic value after the addition to the balance, and transmit the processing result (success/failure) to the electronic value payment terminal 70-M.

According to the first embodiment described above, regardless of which of the electronic values stored in the IC chip 22 in the user terminal 10 is used for the payment, as long as the balance of the utility electronic value is sufficient, the balance of the used electronic value is prevented from becoming insufficient. Note that, when the automatic recharge processing described above is applied to the utility electronic value, the balance of the utility electronic value is prevented from falling below the certain amount, and such a situation that the balance is insufficient at the time of the payment is avoided. Next, modified examples of the first embodiment are described.

(Modified Example 1 of First Embodiment)

When the overwrite command is used as the balance change information for the electronic value, the following processing may be performed inside the IC chip 22. An example in which a payment is performed preferentially from the balance of the M-th electronic value is described here.

When receiving the payment command (overwrite command), the electronic value app A-M provides the utility electronic value app UA with a rewrite amount specified in the payment command. The utility electronic value app UA calculates a difference P obtained by subtracting the payment amount (amount of money obtained by subtracting the rewrite amount from the amount of money returned as the balance) from the balance of the M-th electronic value. In this case, it is assumed that the difference P is a negative number (the balance of the M-th electronic value alone is insufficient for the payment amount).

The utility electronic value app UA generates and outputs the overwrite command (balance change information) to subtract an absolute value of the difference P from the balance of the utility electronic value and rewrite the balance of the M-th electronic value with 0. The electronic value app A-M rewrites the balance of the M-th electronic value in response to the generated overwrite command, and notifies the utility electronic value app UA of the processing result. Further, the electronic value app A-M only transmits the processing result to the electronic value payment terminal 70-M without performing the processing resulting from the payment command input from the electronic value payment terminal 70-M.

Note that, when the difference P is a non-negative number (the balance of the M-th electronic value alone is sufficient for the payment amount), the utility electronic value app UA generates and outputs the overwrite command (balance change information) to rewrite the balance of the M-th electronic value with the difference P. The electronic value app A-M rewrites the balance of the M-th electronic value in response to the generated overwrite command, and notifies the utility electronic value app UA of the processing result. Further, the electronic value app A-M only transmits the processing result to the electronic value payment terminal 70-M without performing the processing resulting from the payment command input from the electronic value payment terminal 70-M.

(Modified Example 2 of First Embodiment)

As in the above-mentioned Modified Example 1, when the overwrite command is used as the balance change information for the electronic value, the following processing may be performed inside the IC chip 22. An example in which a payment is performed preferentially from the balance of the utility electronic value is described here.

When receiving the payment command (overwrite command), the electronic value app A-M provides the utility electronic value app UA with a rewrite amount specified in the payment command. The utility electronic value app UA calculates a difference Q obtained by subtracting the payment amount (amount of money obtained by subtracting the rewrite amount from the amount of money returned as the balance) from the balance of the utility electronic value. In this case, it is assumed that the difference Q is a negative number (the balance of the utility electronic value alone is insufficient for the payment amount).

The utility electronic value app UA rewrites the balance of the utility electronic value with 0, and generates and outputs the overwrite command (balance change information) to rewrite the balance of the M-th electronic value to an amount after an absolute value of the difference Q is subtracted therefrom. The electronic value app A-M rewrites the balance of the M-th electronic value in response to the generated overwrite command, and notifies the utility electronic value app UA of the processing result. Further, the electronic value app A-M only transmits the processing result to the electronic value payment terminal 70-M without performing the processing resulting from the payment command input from the electronic value payment terminal 70-M.

Note that, when the difference Q is a non-negative number (the balance of the utility electronic value alone is sufficient for the payment amount), the utility electronic value app UA rewrites the balance of the utility electronic value with the difference Q. The electronic value app A-M only transmits the processing result to the electronic value payment terminal 70-M without performing the processing resulting from the payment command input from the electronic value payment terminal 70-M.

(Second Embodiment)

Next referring to a sequence chart illustrated in FIG. 7, payment processing according to a second embodiment is described. In the second embodiment, when the utility electronic value is used for a payment, at least one of the first to N-th electronic values is applied to the balance of the utility electronic value to make the payment. Note that, in the example described below, it is assumed that the balance of the utility electronic value at the time of starting the payment is below the payment amount. Note that, in the second embodiment, the utility electronic value app UA causes, in cooperation with hardware resources such as the IC chip 22 included in the user terminal 10, the user terminal 10 to operate as a terminal having a virtual asynchronous payment function (virtual offline payment function).

As illustrated in FIG. 7, when a balance inquiry command for the utility electronic value to be used for the payment is transmitted from the utility electronic value payment terminal 80 (S301), the utility electronic value app UA running on the IC chip 22 issues a balance inquiry command to each of the electronic value apps A-1 to A-N (S302), and receives the respective balances of the first to N-th electronic values from the electronic value apps A-1 to A-N (S303).

The utility electronic value app UA sums the received respective balances of the first to N-th electronic values and the balance of the utility electronic value to calculate the total amount of balances (S304), and transmits the total amount of balances to the utility electronic value payment terminal 80 (S305). When the total amount of balances is equal to or more than the payment amount, a payment command specifying a payment amount (required amount) is transmitted from the utility electronic value payment terminal 80 (S306).

Next, when receiving the above-mentioned payment command, the utility electronic value app UA selects an unselected electronic value (in this case, i-th electronic value) from among the first to N-th electronic values (S307). The electronic values may be selected in an order corresponding to the orders of priority set for the first to N-th electronic values, or may be selected at random. For example, the electronic values may be selected in a descending order of the balances.

The utility electronic value app UA sets a smaller one of a difference between the payment amount specified in the payment command and the balance of the utility electronic value, and the balance of the i-th electronic value as the recharge amount, and requests the electronic value app A-i to subtract the recharge amount (S308). In this case, the utility electronic value app UA generates and outputs the subtract command (balance change information) to decrease the balance of the i-th electronic value. The electronic value app A-i changes the balance of the i-th electronic value in response to the generated subtract command. Note that, the recharge amount is not limited to the above-mentioned example, and a recharge upper limit amount for the i-th electronic value may be set thereto.

The utility electronic value app UA receives from the electronic value app A-i the processing result of subtracting the recharge amount regarding the subtract request from the balance of the i-th electronic value (S309), and proceeds to S307 when the processing result is unsuccessful (S310: N), and adds the recharge amount to the utility electronic value (S311) when the processing result is successful (S310: Y).

When the balance of the utility electronic value after the addition is not equal to the payment amount (or is lower than the payment amount) (S312: N), the utility electronic value app UA returns to S307. When the balance of the utility electronic value after the addition is equal to the payment amount (or is equal to or more than the payment amount) (S312: Y), the utility electronic value app UA subtracts the payment amount from the balance of the utility electronic value in response to the payment command input from the utility electronic value payment terminal 80 (S313), and transmits the processing result (success/failure) to the utility electronic value payment terminal 80 (S314). In this manner, the utility electronic value app UA reloads an amount of money (reload amount), which is required for deducting the payment amount (required amount) from the balance of the utility electronic value, from the balances of one or more electronic values.

According to the second embodiment described above, at the time of the payment with the utility electronic value held in the user terminal 10, the balances of the other electronic values, which are held in the user terminal 10 and are not used for the payment, may also be used. This allows the total amount of the balances of the electronic values (including the utility electronic value) held in the user terminal 10 to be used. Next, modified examples of the second embodiment are described.

(Modified Example 1 of Second Embodiment)

When the overwrite command is used as the balance change information for the utility electronic value, the following processing may be performed inside the IC chip 22.

When receiving the payment command (overwrite command), the utility electronic value app UA calculates a difference R obtained by subtracting the payment amount (amount of money obtained by subtracting the rewrite amount specified in the received payment command from the amount of value returned as the balance) from the balance of the utility electronic value. In this case, when the difference R is a negative number (the balance of the utility electronic value alone is insufficient for the payment amount), the utility electronic value app UA overwrites the balance of the utility electronic value with 0. On the other hand, when the difference R is a non-negative number (the balance of the utility electronic value alone is sufficient for the payment amount), the utility electronic value app UA overwrites the balance of the utility electronic value with an amount of money obtained by subtracting the payment amount therefrom. The utility electronic value app UA only transmits the processing result to the utility electronic value payment terminal 80 without performing the processing resulting from the payment command input from the utility electronic value payment terminal 80.

(Modified Example 2 of Second Embodiment)

Further, in the sequence illustrated in FIG. 7 described above, after receiving the balance inquiry command from the utility electronic value payment terminal 80, the utility electronic value app UA acquires the balances from the electronic value apps A-1 to A-N and calculates the total amount of balances. However, as illustrated in FIG. 8, for example, the utility electronic value app UA may sequentially update and hold a balance list of the first to N-th electronic values, and when receiving the balance inquiry command, refer to the balance list of the first to N-th electronic values to return the total amount of balances.

FIG. 8 is a sequence chart of balance list update processing performed by the utility electronic value app UA.

As illustrated in FIG. 8, the utility electronic value app UA waits when a predetermined timing for executing the balance list update processing (for example, specified timing, timing when a predetermined period of time has elapsed since the last balance aggregation processing, or immediately after the payment) has not arrived (S401: N), and refers to the list of the first to N-th electronic values mounted in the IC chip 22 (S402) and selects an unselected electronic value from the list (S403) when the predetermined timing has arrived (S401: Y). When it is assumed that the electronic value selected in S403 is the i-th electronic value, the utility electronic value app UA issues a balance inquiry command to the electronic value app A-i to inquire the balance of the i-th electronic value (S404), and the electronic value app A-i returns the balance of the i-th electronic value (S405).

The utility electronic value app UA updates the balance list of the electronic values based on the balance of the i-th electronic value (S406), and returns to S403 when the balances of all the electronic values in the list have not been acquired (S407: N) or to S401 when the balances of all the electronic values in the list have been acquired (S407: Y).

As described above, when the balance list of the electronic values is sequentially updated and held, a response time until the balance requested by the utility electronic value payment terminal 80 is returned may be reduced.

(Third Embodiment)

Figure 9A:
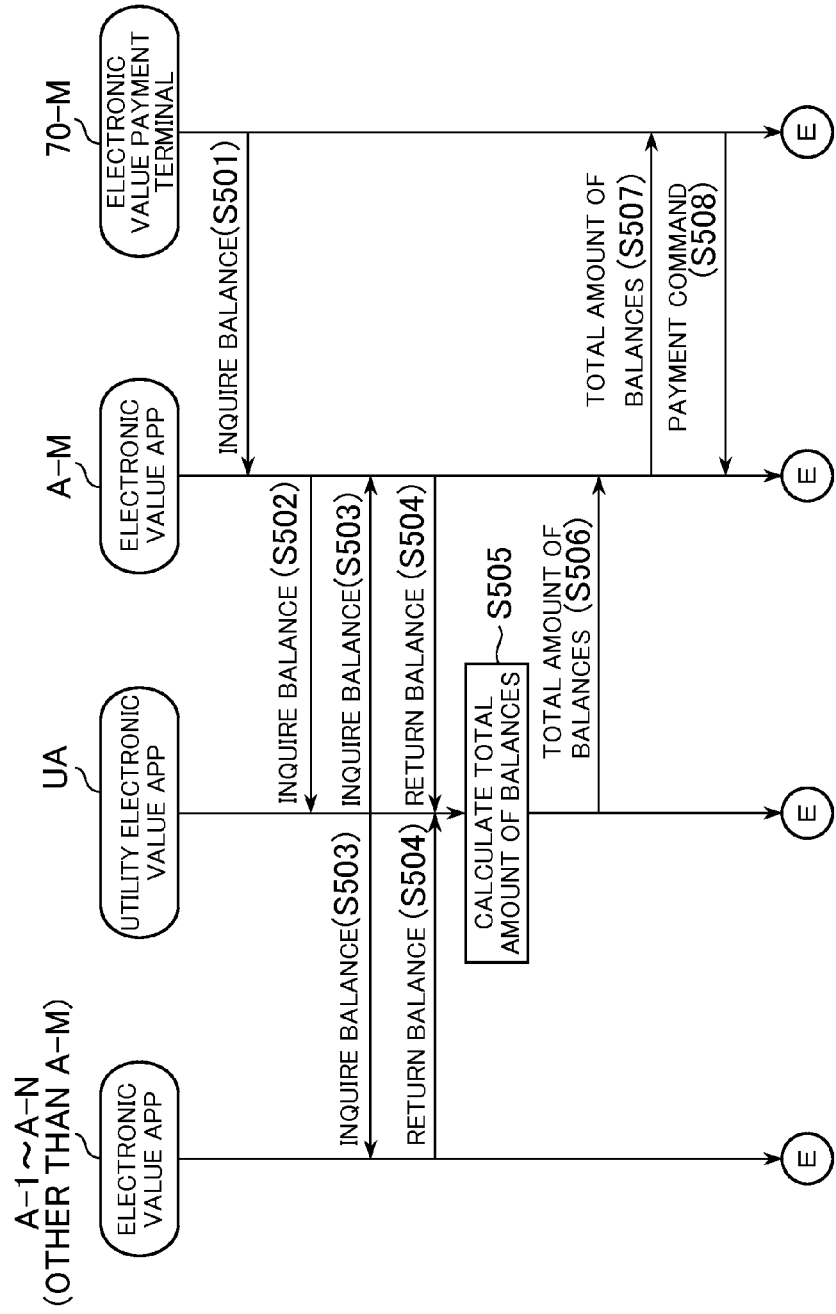
FIG. 9A A sequence chart of payment processing according to a third embodiment.

Next referring to sequence charts illustrated in FIGS. 9A and 9B, payment processing according to a third embodiment is described. In the third embodiment, a payment is made by applying, to the balance of the M-th electronic value of the first to N-th electronic values that is used for the payment, other electronic values that are not used for the payment via the utility electronic value. Note that, in the example described below, it is assumed that the balance of the M-th electronic value at the time of starting the payment is below the payment amount. Note that, in the third embodiment, the utility electronic value app UA causes, in cooperation with hardware resources such as the IC chip 22 included in the user terminal 10, the user terminal 10 to operate as a terminal having a virtual asynchronous deposit function (virtual offline deposit function) and a virtual asynchronous payment function (virtual offline payment function).

As illustrated in FIG. 9A, when a balance inquiry command for the M-th electronic value to be used for the payment is transmitted from the electronic value payment terminal 70-M (S501), the electronic value app A-M running on the IC chip 22 issues a balance inquiry command to the utility electronic value app UA (S502). The utility electronic value app UA issues a balance inquiry command to each of the electronic value apps A-1 to A-N (S503), and receives the balances of the first to N-th electronic values from the electronic value apps A-1 to A-N, respectively (S504).

The utility electronic value app UA sums the received respective balances of the first to N-th electronic values and the balance of the utility electronic value to calculate the total amount of balances (S505), and transmits the total amount of balances to the electronic value app A-M (S506). The electronic value app A-M transmits the above-mentioned total amount of balances to the electronic value payment terminal 70-M (S507). When the total amount of balances is equal to or more than the payment amount, a payment command specifying a payment amount (required amount) is transmitted from the electronic value payment terminal 70-M (S508).

Next, as illustrated in FIG. 9B, when receiving the above-mentioned payment command, the electronic value app A-M provides the payment amount specified in the payment command to the utility electronic value app UA (S509). The utility electronic value app UA selects an unselected electronic value (in this case, i-th electronic value) from among the first to N-th electronic values other than the M-th electronic value (S510). The electronic values may be selected in an order corresponding to the orders of priority set for the first to N-th electronic values, or may be selected at random. For example, the electronic values may be selected in a descending order of the balances.

The utility electronic value app UA sets a difference between the payment amount and the balance of the M-th electronic value as a required recharge amount (first reload amount), sets a smaller one of a difference between the required recharge amount and the balance of the utility electronic value, and the balance of the i-th electronic value as the recharge amount, and requests the electronic value app A-i to subtract the recharge amount (S511). In this case, the utility electronic value app UA generates and outputs the subtract command (balance change information) to decrease the balance of the i-th electronic value. The electronic value app A-i changes the balance of the i-th electronic value in response to the generated subtract command. The recharge amount is not limited to the above-mentioned example, and a recharge upper limit amount for the i-th electronic value may be set thereto.

The utility electronic value app UA receives from the electronic value app A-i the processing result of subtracting the recharge amount regarding the generated subtract request from the balance of the i-th electronic value (S512), and proceeds to S510 when the processing result is unsuccessful (S513: N), and adds the recharge amount to the utility electronic value (S514) when the processing result is successful (S513: Y).

When the balance of the utility electronic value after the addition is not equal to the required recharge amount (or is lower than the required recharge amount) (S515: N), the utility electronic value app UA proceeds to S510. When the balance of the utility electronic value after the addition is equal to the required recharge amount (or is equal to or more than the required recharge amount) (S515: Y), the utility electronic value app UA subtracts the required recharge amount from the balance of the utility electronic value (S516). In this manner, the utility electronic value app UA reloads an amount of money (second reload amount), which is required for deducting the required recharge amount (first reload amount) from the balance of the utility electronic value, from the balances of one or more electronic values. Then, the utility electronic value app UA the utility electronic value app UA newly issues the subtracted required recharge amount's worth of the M-th electronic value (S517), and requests the electronic value app A-M to add the issued required recharge amount's worth to the M-th electronic value (S518). In this case, the utility electronic value app UA generates and outputs the add command (balance change information) to increase the balance of the M-th electronic value.

The electronic value app A-M adds, in response to the generated add command, the required recharge amount to the balance of the M-th electronic value (S519), and notifies the utility electronic value app UA of the processing result (success/failure) (S520). Further, the electronic value app A-M subtracts, in response to the payment command input from the utility electronic value payment terminal 80, the payment amount from the balance of the M-th electronic value after the addition to the balance (S521), and transmits the processing result (success/failure) to the electronic value payment terminal 70-M (S522).

The utility electronic value app UA may perform the processing of S515 and subsequent steps as follows. For example, when the balance of the utility electronic value can afford the required recharge amount (S515: Y), the utility electronic value app UA may issue the required recharge amount's worth of the M-th electronic value, and request the electronic value app A-M to add the issued required recharge amount's worth to the M-th electronic value. Then, the each electronic value app A-M may add the required recharge amount to the balance of the M-th electronic value, and notify the utility electronic value app UA of the processing result (success/failure). Then, when receiving the notification of the successful addition from the electronic value app A-M, the utility electronic value app UA may subtract the required recharge amount from the balance of the utility electronic value. Thereafter, the electronic value app A-M may subtract the payment amount from the balance of the M-th electronic value after the addition to the balance, and transmit the processing result (success/failure) to the electronic value payment terminal 70-M.

According to the third embodiment described above, regardless of which electronic value held in the user terminal 10 is selected for the payment, the balances of the other electronic values (including the utility electronic value), which are held in the user terminal 10 and are not used for the payment, may also be used. This allows the total amount of the balances of the electronic values (including the utility electronic value) held in the user terminal 10 to be used regardless of which electronic value is selected.

In the third embodiment, when the overwrite command is used as the balance change information for the electronic value, the processing may be performed with an idea similar to (Modified Example 1 of first embodiment) or (Modified Example 2 of first embodiment) described above. Alternatively, in the third embodiment, when the overwrite command is used as the balance change information for the utility electronic value, the processing may be performed with an idea similar to (Modified Example 1 of second embodiment) described above.

(Fourth Embodiment)

In the embodiments described above, only the utility electronic value can be directly exchanged (transferred) with the first to N-th electronic values, but the electronic values may be directly exchanged among the first to N-th electronic values. The exchange of the electronic values among the first to N-th electronic values may be realized, for example, by providing each of the electronic value apps A-1 to A-N with functions equivalent to those of the utility electronic value app UA. Next, payment processing according to a fourth embodiment when the electronic values may be exchanged also among the first to N-th electronic values is described. Note that, in the following, distinguishment from the utility electronic value is not required, and hence the electronic values mounted in the IC chip 22 are referred to as first to (N+1) th electronic values. Note that, in the fourth embodiment, the electronic value app A-M causes, in cooperation with hardware resources such as the IC chip 22 included in the user terminal 10, the user terminal 10 to operate as a terminal having a virtual asynchronous deposit function (virtual offline deposit function) and a virtual asynchronous payment function (virtual offline payment function).

Figure 10:
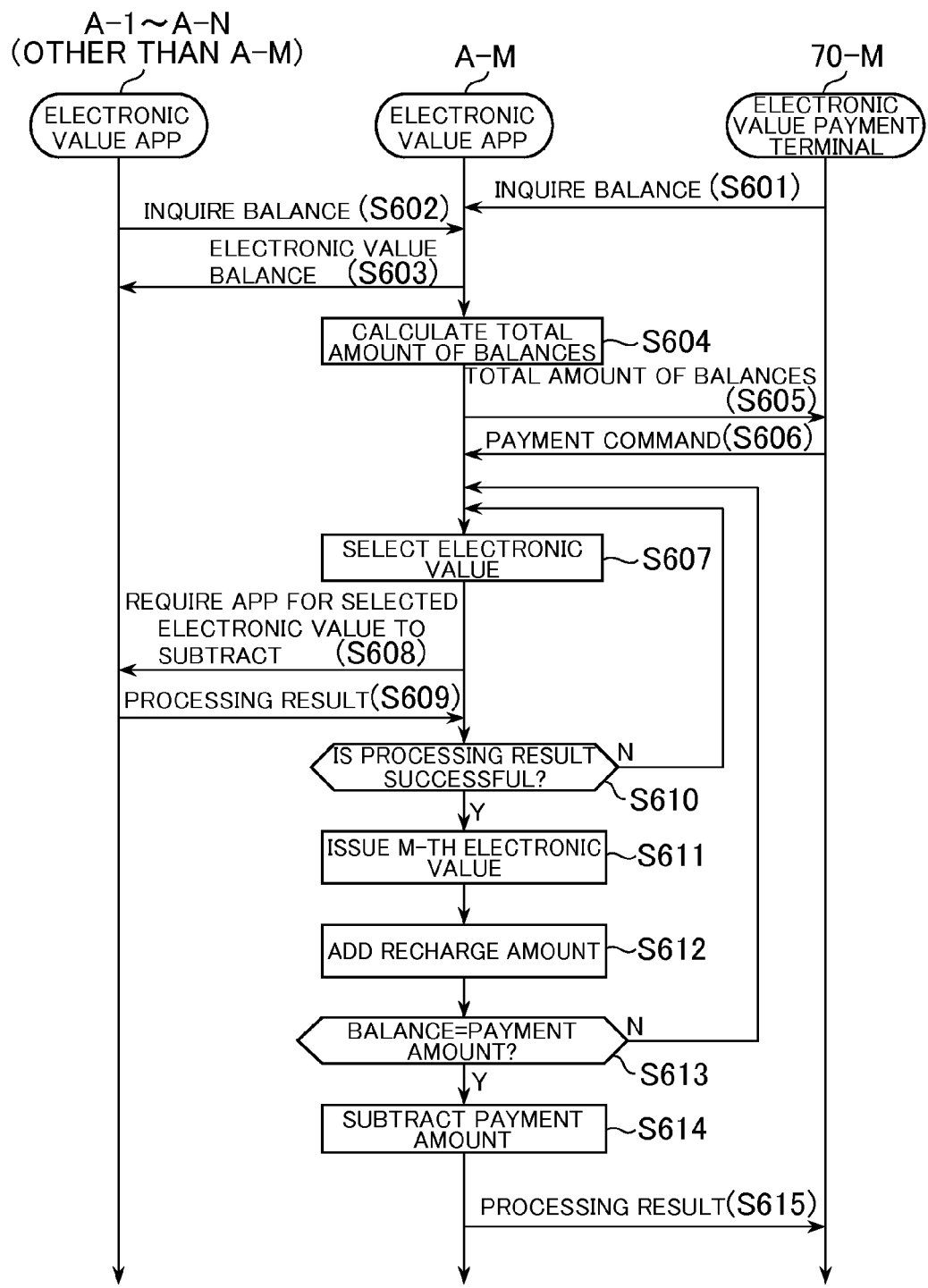
FIG. 10 A sequence chart of payment processing according to a fourth embodiment.

FIG. 10 is a sequence chart of payment processing according to the fourth embodiment. In the fourth embodiment, a payment is made by applying, to the balance of the electronic value (in this case, M-th electronic value) of the first to (N+1)th electronic values that is used for the payment, other electronic values. Note that, in the example described below, it is assumed that the balance of the M-th electronic value at the time of starting the payment processing is below the payment amount.

As illustrated in FIG. 10, when a balance inquiry command for the M-th electronic value to be used for the payment is transmitted from the electronic value payment terminal 70-M (S601), the electronic value app A-M running on the IC chip 22 issues a balance inquiry command to each of other electronic value apps (S602), and receives the respective balances of the electronic values from the other electronic value apps (S603).

The electronic value app A-M sums the respective balances of the first to (N+1)th electronic values to calculate the total amount of balances (S604), and transmits the total amount of balances to the electronic value payment terminal 70-M (S605). When the total amount of balances is equal to or more than the payment amount, a payment command specifying a payment amount (required amount) is transmitted from the electronic value payment terminal 70-M (S606).

The electronic value app A-M selects an unselected electronic value (in this case, i-th electronic value) from among the first to (N+1)th electronic values other than the M-th electronic value (S607). The electronic values may be selected in an order corresponding to the orders of priority set for the first to (N+1) th electronic values, or may be selected at random. For example, the electronic values may be selected in a descending order of the balances.

The electronic value app A-M sets a smaller one of a difference between the payment amount specified in the payment command and the balance of the utility electronic value, and the balance of the i-th electronic value as the recharge amount, and requests the electronic value app A-i to subtract the recharge amount (S608). In this case, in this case, the electronic value app A-M generates and outputs the subtract command (balance change information) to decrease the balance of the i-th electronic value. The electronic value app A-i changes the balance of the i-th electronic value in response to the generated subtract command. The recharge amount is not limited to the above-mentioned example, and a recharge upper limit amount for the i-th electronic value may be set thereto.

The electronic value app A-M receives from the electronic value app A-i the processing result of subtracting the recharge amount regarding the subtract request from the balance of the i-th electronic value (S609), and proceeds to S607 when the processing result is unsuccessful (S610: N), and newly issues the recharge amount's worth of the M-th electronic value (S611) and adds the issued recharge amount's worth regarding the M-th electronic value to the M-th electronic value (S612) when the processing result is successful (S610: Y). In this case, the electronic value app A-M generates the add command (balance change information) to increase the balance of the M-th electronic value, and changes the balance of the M-th electronic value in response to the generated add command.

When the balance of the M-th electronic value after the addition is not equal to the payment amount (or is lower than the payment amount) (S613: N), the electronic value app A-M returns to S607. When the balance of the M-th electronic value after the addition is equal to the payment amount (or is equal to or more than the payment amount) (S613: Y), the electronic value app A-M subtracts the payment amount from the balance of the M-th electronic value in response to the payment command input from the electronic value payment terminal 70-M (S614), and transmits the processing result (success/failure) to the electronic value payment terminal 70-M (S615). In this manner, the electronic value app A-M reloads an amount of money (reload amount), which is required for deducting the payment amount (required amount) from the balance of the M-th electronic value, from the balances of one or more electronic values.

According to the fourth embodiment described above, the total amount of the electronic values held in the user terminal 10 may be used regardless of which of the electronic values held in the user terminal 10 is selected for the payment. Further, the fourth embodiment is reduced in processing load compared to the third embodiment because the processing is not concentrated on the utility electronic value application UA.

In the fourth embodiment, when the overwrite command is used as the balance change information for the electronic value, the processing may be performed with an idea similar to (Modified Example 1 of first embodiment) or (Modified Example 2 of first embodiment) described above.

Note that, the present invention is not limited to the embodiments described above. For example, in the embodiments described above, the example in which the user terminal 10 recharges the electronic values from the electronic value servers 50-1 to 50-N and the utility electronic value server 60 has been described. However, when each of the electronic value payment terminals 70-1 to 70-N and the utility electronic value payment terminal 80 also functions as a recharge terminal, the electronic values may be recharged from the recharge terminals.

Note that, it should be understood that the IC chip 22 according to the embodiments may be mounted not only in the mobile phone but also in an IC card or the like.

The invention claimed is:

1. A user terminal comprising:
at least one memory operable to store a plurality of applications; and
at least one processor operable to read program code in the plurality of applications and operate as instructed by the program code, wherein the at least one processor is a hardware processor,
wherein the plurality of applications comprise a plurality of electronic value applications (EV-Apps) and a utility electronic value application (UEV-App),
wherein each of the EV-Apps comprises:
first information relating to an electronic value of an EV-App;
first program code configured to cause the at least one processor to access the first information;
a first encryption key for accessing the UEV-App; and
second program code configured to cause the at least one processor to cooperate with the UEV-App,
wherein the UEV-App comprises:
second information relating to an electronic value of the UEV-App;
third program code configured to cause the at least one processor to access the second information;
second encryption keys for accessing the plurality of EV Apps; and
fourth program code configured to cause the at least one processor to cooperate with the plurality of EV Apps,
wherein the second program code causes the at least one processor to execute first authentication based on the first encryption key and access the UEV-App, and wherein the fourth program code causes the at least one processor to execute second authentication based on the second encryption keys and access the plurality of EV-Apps.

2. The user terminal according to claim 1,
wherein if an external source accesses any one of the EV-Apps, an accessed EV-App sends a response to the external source,
wherein the second program code of the accessed EV-App causes the at least one processor to access the UEV-App and the second information is referred and/or updated, and
wherein the first program code of the accessed EV-App causes the at least one processor to refer and/or update the first information of the accessed EV-App.

3. The user terminal according to claim 2,
wherein if the second program code of the accessed EV-App causes the at least one processor to access the UEV-App, the fourth program code causes the at least one processor to access at least one EV-App from among the plurality of EV-Apps except the accessed EV-App and refer and/or update the first information of the at least one EV-App.

4. The user terminal according to claim 2, wherein contactless payment between the external source and the accessed EV-App is executed.

5. The user terminal according to claim 4, further comprising a wireless communication circuit operable to communicate with the external source,
wherein the wireless communication circuit comprises an antenna and a high-frequency circuit,
wherein if the external source accesses the accessed EV-App, the wireless communication circuit communicates with the external source by using the antenna and the high-frequency circuit for the contactless payment.

6. The user terminal according to claim 5,
wherein the wireless communication circuit does not communicate with the external source for the first authentication and the second authentication, and
wherein if the first authentication and the second authentication are succeeded, the wireless communication circuit communicate with the external source for the contactless payment.

7. The user terminal according to claim 4,
wherein if a balance of the accessed EV-App is insufficient for the contactless payment, the first authentication and second authentication are executed,
wherein if the first authentication and second authentication are succeeded, the balance of the accessed EV-App is reloaded by the UEV-App,
wherein the contactless payment is executed after the balance of the accessed EV-App is reloaded.

8. The user terminal according to claim 1, further comprising an integrated circuit (IC) chip, wherein the IC chip comprises the at least one processor and the at least one memory.

9. The user terminal according to claim 1,
wherein an external source accesses any one of the EV-Apps to perform contactless payment between the external source and the accessed EV-App,
wherein if a balance of the accessed EV-App is insufficient for the contactless payment,
the second program code causes the at least one processor to execute first authentication based on the first encryption key and access the UEV-App, and the fourth program code causes the at least one processor to execute second authentication based on at least one of the second encryption keys, access at least one EV-App from among the plurality of EV-Apps except the accessed EV-App, refer and/or update the first information of the at least one EV-App, and reload a balance of the UEV-App, wherein if the first authentication and second authentication are successful, the balance of the accessed EV-App is reloaded by the UEV-App, and wherein the contactless payment is executed after the balance of the accessed EV-App is reloaded.

10. The user terminal according to claim 1, wherein a number of the EV-Apps is greater than or equal to 3.

11. A payment method to perform contactless payment between an external source and user terminal, the user terminal comprising at least one memory operable to store a plurality of applications, and at least one processor operable to read program code in the plurality of applications and operate as instructed by the program code, wherein the at least one processor is a hardware processor, the payment method comprising:

providing a plurality of electronic value applications (EV-Apps) and a utility electronic value application (UEV-App) in the plurality of applications;

accessing, by an external source, any one of the EV-Apps to perform contactless payment between the external source and the accessed EV-App; and if a balance of the accessed EV-App is insufficient for the contactless payment, accessing, by the accessed EV-APP, first information relating to an electronic value of an EV-App, wherein the accessed EV-App comprises the first information and a first encryption key for accessing the UEV-App;

executing, by the accessed EV-APP, first authentication based on the first encryption key to access the UEV-App;

performing the UEV-App to access second information relating to an electronic value of the UEV-App, wherein the UEV-App comprises the second information and second encryption keys for accessing the plurality of EV Apps; and executing, by the UEV App, second authentication based on the second encryption keys to access at least one EV-App from among the plurality of EV-Apps except the accessed EV-App, referring and/or updating the first information of the at least one EV-App, and reloading a balance of the UEV-App, wherein if the first authentication and second authentication are successful, the balance of the accessed EV-App is reloaded by the UEV-App, and wherein the contactless payment is executed after the balance of the accessed EV-App is reloaded.

* * * * *